United States Patent
Shin et al.

(10) Patent No.: US 9,367,153 B2
(45) Date of Patent: Jun. 14, 2016

(54) DISPLAY APPARATUS AND METHOD THEREOF

(71) Applicant: SAMSUNG ELECTRONICS CO., LTD., Suwon-si (KR)

(72) Inventors: Jong-chul Shin, Seongnam-si (KR); Na-young Kwon, Suwon-si (KR); Sang-bong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 13/954,243

(22) Filed: Jul. 30, 2013

(65) Prior Publication Data

US 2014/0035850 A1 Feb. 6, 2014

(30) Foreign Application Priority Data

Aug. 2, 2012 (KR) ........................ 10-2012-0084860

(51) Int. Cl.
| | |
|---|---|
| *G06F 3/041* | (2006.01) |
| *G06F 3/147* | (2006.01) |
| *F25D 29/00* | (2006.01) |
| *G06F 3/01* | (2006.01) |

(52) U.S. Cl.
CPC .............. *G06F 3/041* (2013.01); *F25D 29/005* (2013.01); *G06F 3/0416* (2013.01); *G06F 3/147* (2013.01); *F25D 2400/361* (2013.01); *F25D 2700/04* (2013.01); *G06F 3/011* (2013.01); *G06F 2203/04101* (2013.01); *G06F 2203/04108* (2013.01); *G06F 2203/04804* (2013.01); *G09G 2320/0261* (2013.01)

(58) Field of Classification Search
None
See application file for complete search history.

(56) References Cited

U.S. PATENT DOCUMENTS

| | | | | |
|---|---|---|---|---|
| 6,361,438 | B1* | 3/2002 | Morihira | ......................... 463/31 |
| 2008/0043022 | A1* | 2/2008 | Ishihara | .................. A63F 13/10 345/428 |
| 2008/0122798 | A1* | 5/2008 | Koshiyama | ........... G06F 3/0412 345/173 |
| 2008/0225007 | A1* | 9/2008 | Nakadaira et al. | ............ 345/173 |
| 2008/0288895 | A1* | 11/2008 | Hollemans | .............. G06F 3/041 715/863 |
| 2009/0058829 | A1* | 3/2009 | Kim et al. | ...................... 345/173 |
| 2009/0289914 | A1* | 11/2009 | Cho | ......................... G06F 3/044 345/173 |
| 2009/0298554 | A1* | 12/2009 | Kim | ........................ H04M 1/21 455/574 |
| 2010/0146461 | A1 | 6/2010 | Ryu et al. | |
| 2011/0093778 | A1* | 4/2011 | Kim | ........................ G06F 3/041 715/702 |
| 2011/0128223 | A1 | 6/2011 | Lashina et al. | |
| 2012/0120312 | A1* | 5/2012 | Yamasaki | .......... H04N 5/44504 348/461 |
| 2012/0256886 | A1* | 10/2012 | Ryu | ...................... G06F 1/1632 345/204 |
| 2013/0050151 | A1* | 2/2013 | Tu | ......................... G06F 3/0416 345/178 |

OTHER PUBLICATIONS

Communication, dated Nov. 20, 2013, issued by the European Patent Office, in counterpart Application No. 13178593.3.

* cited by examiner

*Primary Examiner* — Dismery Mercedes
(74) *Attorney, Agent, or Firm* — Sughrue Mion, PLLC

(57) ABSTRACT

A display apparatus and a method thereof. The display apparatus includes a display with variable transparency, a sensor which senses a location of at least one of a person and an object, and a controller which determines proximity of the at least one of the person and the object to the display based on a result of the sensing by the sensor, and adjusts the transparency of the display differently according to a result of the determining. Accordingly, a user can easily recognize contents displayed on the display screen having high transparency in the display apparatus.

23 Claims, 13 Drawing Sheets

DISPLAY APPARATUS AND METHOD THEREOF

CROSS-REFERENCE TO RELATED APPLICATION

This application claims priority from Korean Patent Application No. 10-2012-0084860, filed on Aug. 2, 2012, in the Korean Intellectual Property Office, the disclosure of which is incorporated herein by reference in its entirety.

BACKGROUND

1. Field

Methods and apparatuses consistent with exemplary embodiments relate to a display apparatus and a method thereof, and more particularly, to a display apparatus which provides a transparent display screen and a method thereof.

2. Description of the Related Art

As electronic technologies develop, various kinds of display apparatuses are used. In recent years, there is more research and discussion on next generation display apparatuses such as a transparent display apparatus.

A display apparatus which provides a transparent display screen (hereinafter, referred to as a transparent display apparatus) refers to an apparatus which has transparency and thus allows a background view i.e., allows views behind the apparatus to be seen. Conventionally, a display panel is manufactured using an opaque semiconductor compound such as silicon (Si) or gallium arsenide (GaAs). However, as various application fields that an existing display panel cannot deal with have been developed, an effort to develop an electronic element of a new type has been made. One of those that have been developed under such an effort is a transparent display apparatus.

The transparent display apparatus is realized in the form of including a transparent oxide semiconductor film and thus provides transparency. If such a transparent display apparatus is used, a user can see necessary information through a screen of the transparent display apparatus, while seeing a background view provided behind the apparatus. Therefore, the transparent display apparatus can remove constraints of space and time that conventional display apparatuses have.

The transparent display apparatus may be conveniently used in various environments for various purposes. For instance, if a show window of a store is realized by a transparent display apparatus, the show window displays advertising copy when a customer is passing by the store and arouses the customer's interest. Also, if a window of a veranda in a house is provided with a transparent display apparatus, a user can view various multimedia contents through the window of the veranda which has a large size, so that user's satisfaction can be improved.

As described above, the transparent display apparatus has many advantages due to its transparency in comparison with the conventional display apparatuses. However, the transparent display apparatus has also disadvantages due to its transparency. For example, information to be provided to a user on the screen could not be seen well due to such transparency.

Therefore, there is a demand for a technology for using a transparent display apparatus more effectively and diversely.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a display apparatus which can display information effectively and a method thereof.

According to an aspect of an exemplary embodiment, there is provided a display apparatus including: a display with variable transparency, a sensor which senses a location of an entity, and a controller which determines proximity of the entity to the display based on a result of the sensing by the sensor, and which adjusts transparency of the display differently according to a result of the determining.

The display apparatus may further include a storage which stores a threshold value for determining the proximity by the controller. In addition, when a distance between the display and the entity is less than or equal to the stored threshold value, the controller may decrease the transparency of the display to be lower than a pre-set transparency.

When the distance between the display and the entity is greater than the threshold value, the controller may maintain the display at the pre-set transparency or returns the display to the pre-set transparency.

If the distance between the display and the entity is less than or equal to the threshold value, the controller may control the display to display a border area on the display.

The storage may further store a plurality of transparency levels which are classified by the proximity of the entity to the display, and the controller may adjust the transparency of the display according to a transparency level, selected from among the plurality of transparency levels, corresponding to the determined proximity.

The display may provide a content execution screen which has a transparency lower than the pre-set transparency, and if the distance between the display and the entity is less than or equal to the threshold value, the controller may increase the transparency of the display displaying contents to the pre-set transparency.

The display may provide a content execution screen which has a transparency higher than the pre-set transparency, and if the distance between the display and the entity is less than or equal to the threshold value, the controller may decrease the transparency of a portion of the display where pre-set information is displayed.

The display apparatus may further include a communication interface which communicates with an external apparatus. In addition, if the distance between the display and the entity is less than or equal to the threshold value, the controller may decrease transparency of an area on which a content associated with user information received from the external apparatus is displayed to be lower than the pre-set transparency based on the user information.

The sensor may include at least one of a proximity sensor, an IR sensor, an RF sensor, a gyro sensor, an acceleration sensor, an ultrasonic sensor, and a touch sensor.

The sensor may further sense an ambient temperature of the display. In addition, the controller may determine the proximity of the entity to the display based on the sensed ambient temperature.

According to an aspect of another exemplary embodiment, there is provided a method of displaying a display screen of a display apparatus, the method including: sensing a location of an entity, determining proximity of the entity to the display screen based on a result of the sensing, and adjusting transparency of the display screen differently according to a result of the determining.

The adjusting may include, when a distance between the display screen and the entity is less than or equal to a stored threshold value, decreasing the transparency of the display screen to be lower than a pre-set transparency.

The adjusting may include, when the distance between the display screen and the entity is greater than the threshold value, maintaining or returning the transparency to the pre-set transparency.

If the distance between the display screen and the entity is less than or equal to the threshold value, the adjusting may include displaying a border area on the display screen.

If the distance between the display screen and the entity is less than or equal to the threshold value, the adjusting may include changing the display screen to a pre-set screen.

The adjusting may include adjusting the transparency of the display screen according to a transparency level, selected from among a plurality of transparency levels, corresponding to the distance between the display screen and the entity. In addition, the plurality of transparency levels may be classified by the proximity of the entity to the display screen and are pre-stored.

The adjusting may include providing a content execution screen which has a transparency lower than the pre-set transparency, and if the distance between the display screen and the entity is less than or equal to the threshold value, the adjusting may include increasing the transparency of the display screen displaying contents to the pre-set transparency.

The adjusting may include providing a content execution screen which has transparency higher than the pre-set transparency. In addition, if the distance between the display screen and the entity is less than or equal to the threshold value, the adjusting may include decreasing transparency of a portion of the screen on which pre-set information is displayed.

If the distance between the display screen and the entity is less than or equal to the threshold value, the adjusting may include decreasing the transparency of only a portion of the screen on which a content associated with user information received from an external apparatus is displayed to be lower than the pre-set transparency based on the user information.

The sensing may include sensing by at least one of a proximity sensor, an IR sensor, an RF sensor, a gyro sensor, an acceleration sensor, an ultrasonic sensor, and a touch sensor.

The sensing may further include sensing an ambient temperature of the display screen, and the determining may include determining the proximity of the entity to the display screen based on the sensed ambient temperature.

The entity may include at least one of a person or a part thereof and an object.

The controller may control the display to display the border area in a distinct color.

According to the various exemplary embodiments described above, the user can easily recognize the contents displayed through the display screen having high transparency in the display apparatus.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Figure 1:
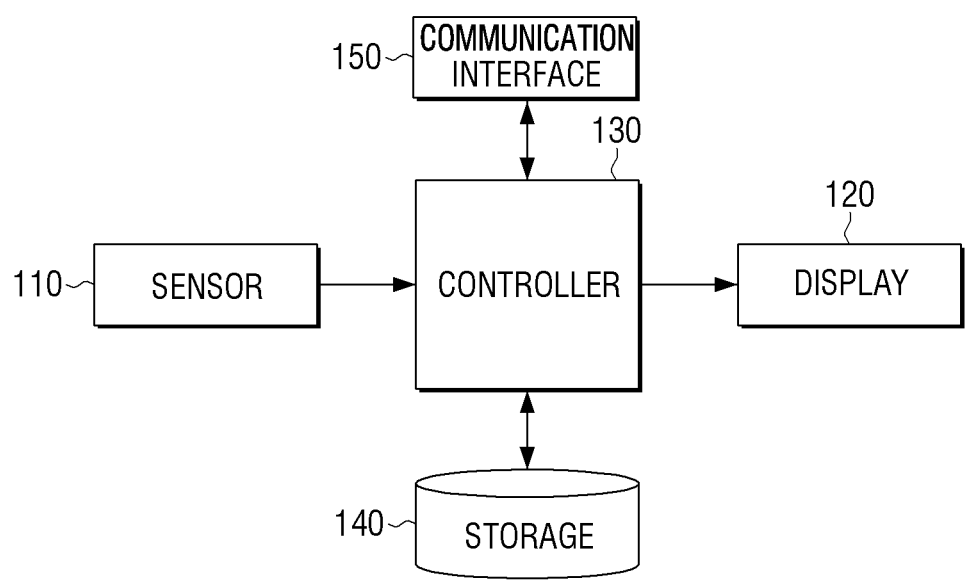
FIG. 1 is a block diagram illustrating a display apparatus according to an exemplary embodiment.

Hereinafter, exemplary embodiments will be described in greater detail with reference to the accompanying drawings.

In the following description, same reference numerals are used for analogous elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a display apparatus according to an exemplary embodiment.

As shown in FIG. 1, a display apparatus 100 includes a sensor 110, a display 120, a controller 130, a storage 140, and a communication interface 150.

The sensor 110 senses a location of at least one of a person and an object, and may be realized by at least one of a proximity sensor, an infrared ray (IR) sensor, a radio frequency (RF) sensor, a gyro sensor, an acceleration sensor, an ultrasonic sensor, and a touch sensor. According to an exemplary embodiment, the sensor 110 may be mounted on a front surface and/or a rear surface of the display apparatus 100. For example, if a user approaches the front surface of the display apparatus 100, the sensor 110 mounted on the front surface may sense a location of the user approaching the front surface of the display apparatus 100. On the other hand, if the user approaches the rear surface of the display apparatus 100, the sensor 110 mounted on the rear surface may sense a location of the user approaching the rear surface of the display apparatus 100. The technology for measuring a distance to the display apparatus 100 by sensing a location of an object or a user, which is located in the proximity of the display apparatus 100, using the sensor 110 is well known, and thus a detailed description thereof is omitted.

According to an exemplary embodiment, the sensor 110 may further include a temperature sensor and may sense an ambient temperature of the display 120 using the temperature sensor.

Transparency of the display 120 is adjustable. By adjusting the transparency of the display 120, the display apparatus 100 can display a content provided by the display apparatus 100 and allow all objects including a person located at one side of the display apparatus 100 to be seen therethrough. According to an exemplary embodiment, the display apparatus 100 may be realized in various forms such as a transparent liquid crystal display (LCD) type, a transparent thin-film electroluminescent panel (TFEL) type, a transparent organic electro luminescence display (OLED) type, and a projection type. Various exemplary embodiments of the structure of the display apparatus 100 described above will be explained below. However, the present disclosure is not limited to this, and the display apparatus 100 may be realized as a transparent display made from other materials than the transparent LCD type, the transparent TFEL type, the transparent OLED type, and the projection type.

The transparent LCD type refers to a display apparatus that removes a backlight unit from an existing LCD apparatus and uses a pair of polarizing plates, an optical film, a transparent thin film transistor, and a transparent electrode. The transparent LCD apparatus has low transmittance due to the presence of the polarizing plate or the optical film and also has low light efficiency since ambient light is used instead of the backlight unit, but has the advantage of being able to realize a large size transparent display.

The transparent TFEL type refers to an apparatus that uses an alternating current inorganic thin film electro luminescence display (AC-TFEL) comprised of a transparent electrode, an inorganic fluorescent substance, and an insulating film. The AC-TFEL is a display that emits light by exciting the fluorescent substance by allowing accelerated electrons to pass through the inorganic fluorescent substance. If the transparent display 120 is realized by the transparent TFEL, the controller 130 adjusts the electron to be projected onto an appropriate location and determines an information display location. Since the inorganic fluorescent substance and the insulating film have transparency, a very transparent display may be realized.

The transparent OLED refers to a display apparatus that uses an OLED which emits light by itself. Since an organic light emitting layer is transparent, if transparent electrodes are used as opposite electrodes, the OLED may be used as a display apparatus. The OLED injects electrons and holes into opposite sides of the organic light emitting layer so that the electrons and the holes are combined with each other in the organic light emitting layer and thus light is emitted. The transparent OLED apparatus displays information by injecting electrons and holes into a desired location using this principle.

Figure 2:
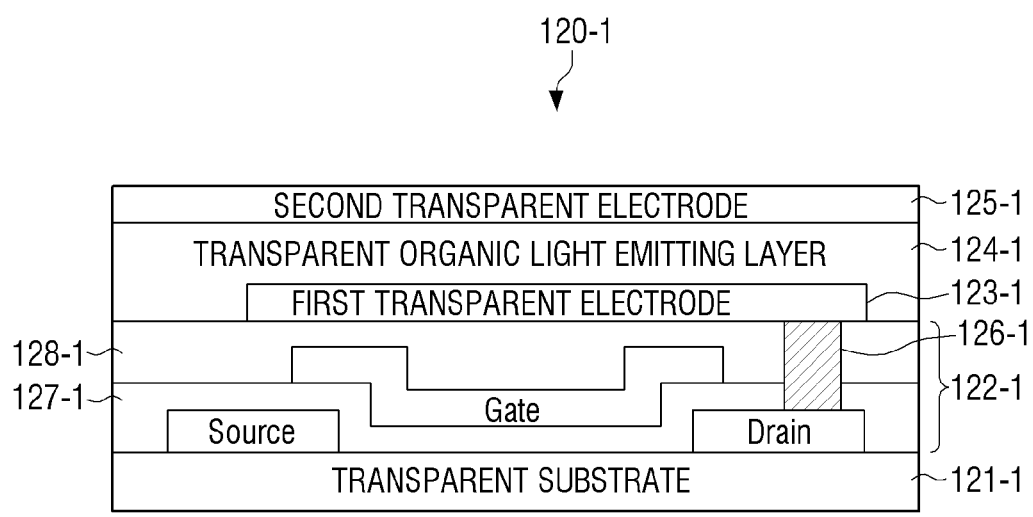
FIG. 2 is an exemplary view illustrating a detailed structure of a transparent organic electro luminescence display (OLED) type display according to an exemplary embodiment.

FIG. 2 is an exemplary view illustrating a detailed structure of a transparent OLED type display according to an exemplary embodiment.

For the convenience of explanation, reference numeral 120-1 is used for the transparent OLED type display. As shown in FIG. 2, the display 120-1 of the transparent OLED type includes a transparent substrate 121-1, a transparent transistor layer 122-1 (which includes various dielectric films 127-1 and 128-1), a first transparent electrode 123-1, a transparent organic light emitting layer 124-1, a second transparent electrode 125-1, and a connection electrode 126-1.

The transparent substrate 121-1 may use a polymer material such as plastic having transparency or glass. The material of the transparent substrate 121-1 may be determined according to an environment to which the display apparatus 100 is applied. For instance, the polymer material may be used in a portable display apparatus due to its lightness and flexibility, and the glass may be used for a show window of a store or a general window.

The transparent transistor layer 122-1 refers to a layer that includes a transistor which is manufactured using a transparent material such as zinc oxide or titanium oxide instead of opaque silicon of an existing thin film transistor. The transparent transistor layer 122-1 includes a source, a gate, a drain, and various dielectric films 127-1 and 128-1, and also includes the connection electrode 126-1 to electrically connect the drain and the first transparent electrode 123-1. FIG. 2 illustrates only one transparent transistor including the source, the gate, and the drain in the transparent transistor layer 122-1, but in practice, a plurality of transparent transistors which are evenly distributed over a whole area of a display surface may be provided. The controller 130 applies a control signal to gates of the transistors of the transparent transistor layer 122-1, thereby driving a corresponding transistor and displaying information.

The first transparent electrode 123-1 and the second transparent electrode 125-1 are disposed opposite to each other with reference to the transparent organic light emitting layer 124-1. The first transparent electrode 123-1, the transparent organic light emitting layer 124-1, and the second transparent electrode 125-1 form transparent organic light emitting diodes (OLED).

The transparent organic light emitting diode is divided into a passive matrix OLED (PMOLED) and an active matrix OLED (AMOLED) according to a driving method. The PMOLED forms a pixel at a location where the first and the second transparent electrodes 123-1 and 125-1 intersect each other. On the other hand, the AMOLED includes a thin film transistor (TFT) to drive each pixel. FIG. 2 illustrates the AMOLED.

The first transparent electrode 123-1 and the second transparent electrode 125-1 include a plurality of line electrodes. The plurality of line electrodes are aligned perpendicular to each other. For example, if the line electrodes of the first transparent electrode 123-1 are aligned in a horizontal direction, the line electrodes of the second transparent electrode 125-1 are aligned in a vertical direction. Accordingly, a plurality of intersecting areas are formed between the first transparent electrode 123-1 and the second transparent electrode 125-1. The transparent transistor is connected to each intersecting area as shown in FIG. 2.

The controller 130 generates a potential difference in each intersecting area using the transparent transistor. Electrons and holes flow into the transparent organic light emitting layer 124-1 from each electrode in each intersecting area in which the potential difference is formed, and are combined with each other, so that light is emitted. On the other hand, an intersecting area in which a potential difference is not generated does not emit light and accordingly a background view behind the apparatus is transparently seen through such an intersecting area.

An indium tin oxide (ITO) may be used for the first and the second transparent electrodes 123-1 and 125-1. A new material such as graphene may be used. The graphene refers to a material that has a honeycomb plane structure in which carbon atoms are connected to one another, and has transparency. Besides these, various materials may be used for the transparent organic light emitting layer 124-1, as is known to one of ordinary skill in the art.

As described above, the display 120 (shown in FIG. 1) may be a projection type display apparatus, a transparent TFEL type display apparatus, and a transparent OLED type display apparatus. The projection type refers to a method that displays an image by projecting the image onto a transparent screen such as a head up display.

Figure 3:
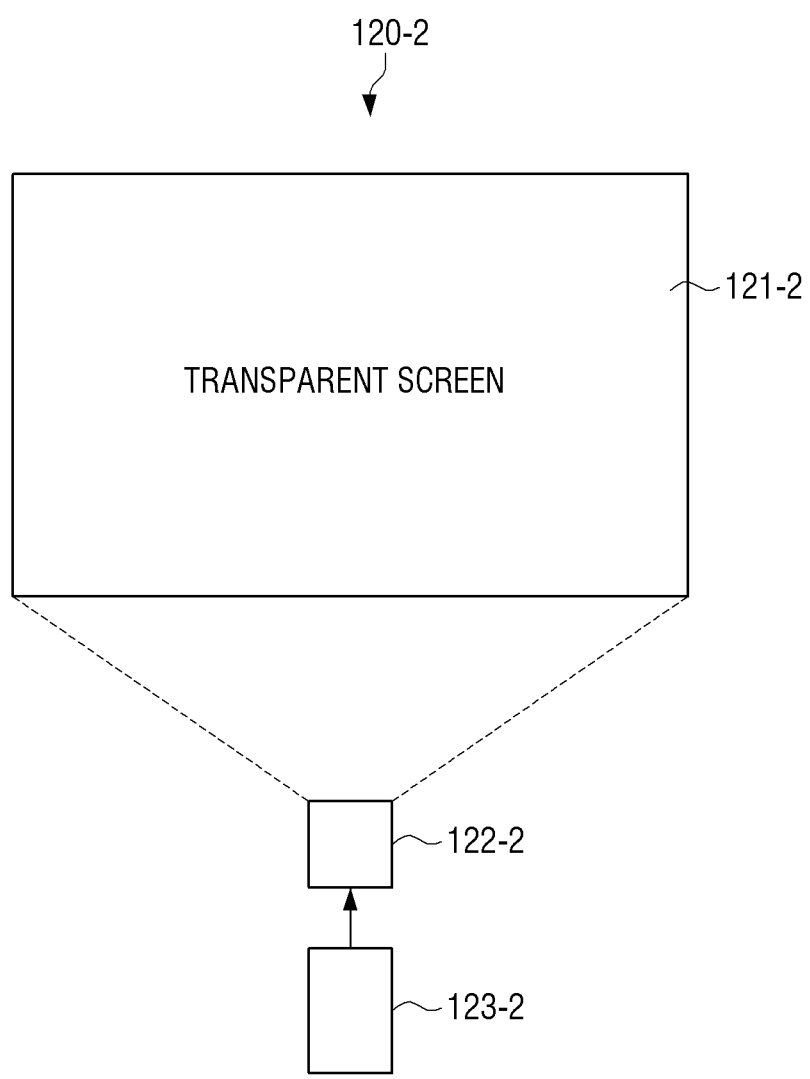
FIG. 3 is an exemplary view illustrating a detailed structure of a projection type display according to an exemplary embodiment.

FIG. 3 is an exemplary view illustrating a detailed structure of a projection type display according to an exemplary embodiment.

For the convenience of explanation, reference numeral 120-2 is used for the projection type display. The projection type display 120-2 includes a transparent screen 121-2, an optical apparatus 122-2, and a light source apparatus 123-2.

The light source apparatus 123-2 emits light for displaying information using various types of light sources such as a vacuum fluorescent display (VFD), a cathode ray tube (CRT), an LCD, and an LED. The optical apparatus 122-2 transmits the light emitted from the light source apparatus 123-2 to the transparent screen 121-2 and projects the light onto the transparent screen 121-2. The optical apparatus 122-2 may be realized by a light guide plate which includes at least one lens and a mirror.

The light source apparatus 123-2 and the optical apparatus 122-2 may be realized by a single display module. Accordingly, the display module is disposed at upper, lower, left, and right borders of the transparent screen 121-2 to project light onto the transparent screen 121-2 and display information on the transparent screen 121-2 according to an exemplary embodiment. Alternatively, a holography method, which uses laser as a light source, may be used. In this case, information is directly depicted on the transparent screen 121-1 using laser.

The transparent screen 121-2 may be made of general glass. The structure of the display 120-2 of FIG. 3 may be employed if the display apparatus 100 is applied to a window of a movable object such as a vehicle, a ship, and an airplane, a window of a house, and a viewing window of a store. As described above, the display apparatus 100 according to an exemplary embodiment is applied to various environments, and recognizes a location of a user or an object, forms a screen based on the location, and displays the screen.

As described above, if a location of at least one of a person and an object is sensed by the sensor 110, the controller 130 calculates a distance measurement value by measuring a distance between the sensed location and the display 120. After that, the controller 130 compares the calculated distance measurement value and a threshold value pre-stored in the storage 140, and controls to adjust the transparency of the display 120. The calculated distance measurement value is a measurement value of a distance between the sensed location of at least one of the person and the object and the display 120, and the threshold value pre-stored in the storage 140 may be a value based on which it is determined whether at least one of the person and the object approaches the display apparatus 100 or not.

Accordingly, if the calculated distance measurement value is less than or equal to the pre-stored threshold value, the controller 130 may decrease the transparency of the display 120 to be lower than pre-set transparency, and, if the calculated distance measurement value is greater than the pre-stored threshold value, the controller 130 may return the transparency to the pre-set transparency. If the transparency of the display 120 is decreased to be lower than the pre-set transparency, visibility of content currently displayed through the display 120 increases. If the transparency is returned to the pre-set transparency, the transparency of the display 120 increases and visibility of the object which is located outside of the display apparatus increases.

The above-described exemplary sensor 110 may further include a temperature sensor and may sense an ambient temperature of the display 120 using the temperature sensor. In this case, the controller 130 may determine whether at least one of a person and an object approaches the display 120 or not based on an ambient temperature sensed by the sensor 110. That is, the controller 130 compares the ambient temperature sensed by the sensor 110 and a pre-stored threshold value. If the ambient temperature is higher than or equal to the pre-stored threshold value, the controller 130 may decrease the transparency of the display 120 to be lower than pre-set transparency, and, if the ambient temperature is lower than the pre-stored threshold value, the controller 130 returns the transparency of the display 120 to the pre-set transparency.

As described above, the controller 130 according to an exemplary embodiment determines whether at least one of the person and the object is approaching according to the location of the at least one of the person and the object or the ambient air. The transparency of the display 120 may be adjusted differently according to a result of the sensing by the sensor 110, and hereinafter, an operation of determining whether at least one of the person and the object is approaching the display apparatus 100 according to the location of the at least one of the person and the object, and adjusting the transparency of the display 120 differently according to the result of the determining will be explained in detail. Hereinafter, the operation of adjusting the transparency of the display 120 differently according to various exemplary embodiments will be explained.

According to an exemplary embodiment, the controller 130 may compare a calculated distance measurement value and a threshold value pre-stored in the storage 140, and may adjust the transparency of the display 120 differently. As described above, the calculated distance measurement value is a value indicating a distance between a location of at least one of a person and an object and the display 120, and the threshold value pre-stored in the storage 140 is a value based on which it is determined whether at least one of the person and the object is approaching the display apparatus 100. Accordingly, if the calculated distance measurement value is less than or equal to the pre-stored threshold value, the controller 130 decreases the transparency of the display 120 to be lower than pre-set transparency, and, if the calculated distance measurement value is greater than the pre-stored threshold value, the controller 130 returns the transparency of the display 120 to the pre-set transparency. As described above, in an exemplary embodiment, the display apparatus 100 may adjust the transparency of the display 120 differently according to the proximity of at least one of the person and the object to the display apparatus 100.

According to another exemplary embodiment, the controller 130 may compare the calculated distance measurement value and the threshold value pre-stored in the storage 140, and, if the calculated distance measurement value is less than or equal to the threshold value, the controller 130 may display a border area of the display 120 in a different color. For example, if the calculated distance measurement value is less than or equal to the pre-stored threshold value, the controller 130 may control to display the border area of the display 120 in blue. According to such a control command, the display 120 displays the border area in blue. Accordingly, the user can easily recognize an entire contour of the display apparatus 100 by the color displayed on the transparent display 120. In the state in which the border area of the display 120 is displayed in blue, if the calculated distance measurement value is greater than the threshold value, the controller 130 may return the border area of the display 120 which is displayed in the different color to its original state.

According to still another exemplary embodiment, the controller 130 may compare the calculated distance measurement value and the threshold value pre-stored in the storage 140, and, if the calculated distance measurement value is less than or equal to the threshold value, the controller 130 may change a current screen displayed through the display 120 to a pre-set screen. On the other hand, if the calculated distance measurement value is greater than the threshold value, the controller 130 may change the pre-set screen displayed through the display 120 to a transparent screen. As described above, according to the proximity of at least one of the person and the object to the display 120, the controller 130 may increase the transparency of the display 120 so that the object located outside of the display apparatus 100 is seen through the display 120, or may change the screen on which the object seen through the display 120 is displayed into the pre-set screen.

According to still another exemplary embodiment, the controller 130 may adjust the transparency of the display 120 differently according to a result of comparing the calculated distance measurement value and the threshold value pre-stored in the storage 140. Specifically, the storage 140 may store a plurality of transparency levels which are classified by the proximity of at least one of the person and the object to the display 120. Accordingly, if a distance measurement value between at least one of the person and the object and the display 120 is calculated based on a location sensed by the sensor, the controller 130 may adjust the transparency of the display 120 differently based on a transparency level corresponding to the calculated distance measurement value from among the plurality of transparency levels stored in the storage 140.

According to yet another exemplary embodiment, the display 120 may provide a content execution screen which has transparency lower than pre-set transparency. In this case, if the calculated distance measurement value is less than or equal to the pre-stored threshold value as a result of comparing the calculated distance measurement value and the threshold value pre-stored in the storage 140, the controller 130 may increase the transparency of the display 120 providing the content execution screen to the pre-set transparency.

Specifically, the display 120 may display content received from a server through a communication interface 150 communicating with the server providing the content. The communication interface 150 communicating with the server providing the content may include various communication modules such as a near field communication (NFC) module (not shown) and a wireless communication module (not shown). The NFC module (not shown) may be Bluetooth or Zigbee, and the wireless communication module (not shown) may be a module which is connected to an external network for communication according to a wireless communication protocol such as Wi-Fi or IEEE. However, the present disclosure is not limited to this and the wireless communication module (not shown) may be a mobile communication module which is connected to a mobile communication network for communication according to various mobile communication standards such as $3^{rd}$ generation (3G), $3^{rd}$ generation partnership project (3GPP), and long term evolution (LTE). Accordingly, if a content is received from a server through such a communication module, the display 120 may display the received content.

However, the present disclosure is not limited to this and the display 120 may receive content from a server through a receiver (not shown) such as a network interface card, or may receive content through an external apparatus including various types of recording media such as a CD, a DVD, a hard disk, a blue-ray disk, a memory card, and an USB memory. The server which provides content may be a web server which provides a web page content.

As described above, if a location of at least one of a person and an object is sensed in a state in which content is being displayed on the screen through the display 120, the controller 130 calculates a distance measurement value by measuring a distance between the sensed location and the display 120. After that, the controller 130 compares the calculated distance measurement value and a threshold value pre-stored in the storage 140. If the distance measurement value is less than or equal to the pre-stored threshold value as a result of the comparison, the controller 130 determines that at least one of the person and the object approaches and increases the transparency of the display 120 displaying the content to the pre-set transparency. Accordingly, the display 120 displaying the content allows the object located outside the display to be seen through the display and displays the object on the screen.

According to yet another exemplary embodiment, the display 120 may provide a content execution screen which has transparency higher than a pre-set transparency. In this case, if the calculated distance measurement value is less than or equal to the pre-set threshold value as a result of comparing the calculated distance measurement value and the threshold value pre-stored in the storage 140, the controller 130 may decrease transparency of an area on which pre-set information is displayed out of a whole area of the display 120. According to such a control command, the display 120 allows the object located outside of the display to be seen through only a certain area or areas of the entire area of the screen and displays the object onto the screen, and also displays pre-set information on the other area through which the object is not seen.

According to yet another exemplary embodiment, the communication interface 150 described above with reference to FIG. 1 may communicate with an external apparatus. If the calculated distance measurement value is less than or equal to the threshold value pre-stored in the storage 140, the controller 130 may decrease transparency of an area on which a content associated with user information received from the external apparatus through the communication interface 150 is to be displayed to be lower than pre-set transparency based on the user information. According to such a control command, the display 120 allows the object located outside to be seen through only the other area on which the content associated with the user information is not displayed, and decreases transparency of the area on which the content is displayed. Accordingly, the user can easily recognize the content associated with the user through the area in which the transparency is decreased.

Up to now, the operation of each element of adjusting the transparency of the display screen in the display apparatus 100 has been described. Hereinafter, the operation of the display apparatus 100 described above will be explained in detail with reference to FIGS. 4 to 12.

Figure 4:
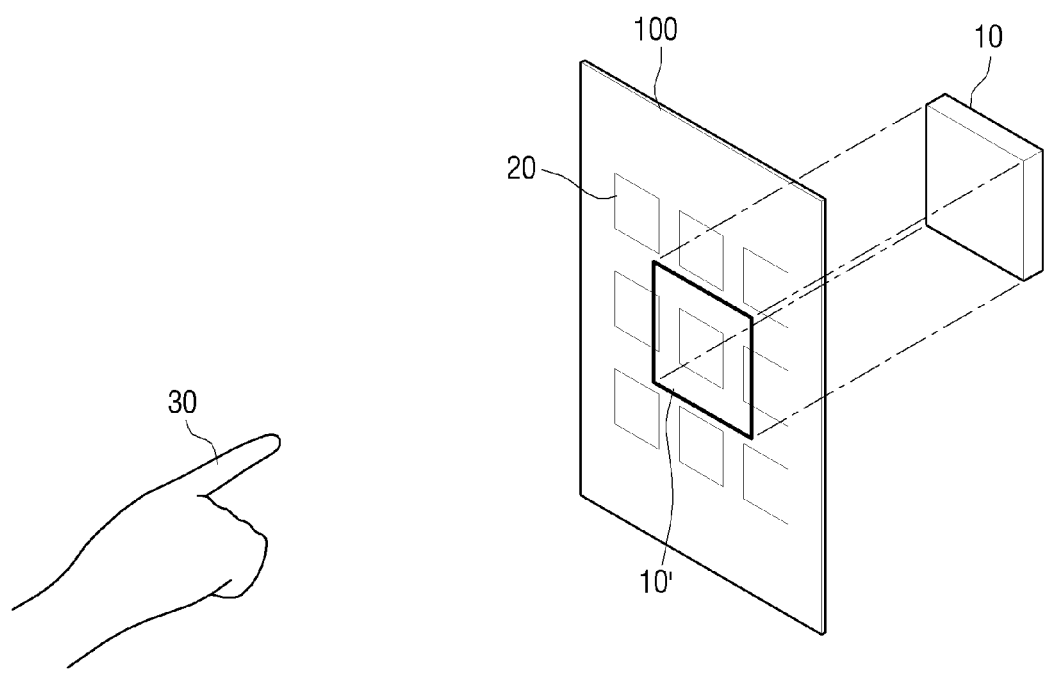
FIG. 4 is an exemplary view illustrating a display apparatus which provides a transparent display screen according to an exemplary embodiment.
Figure 5:
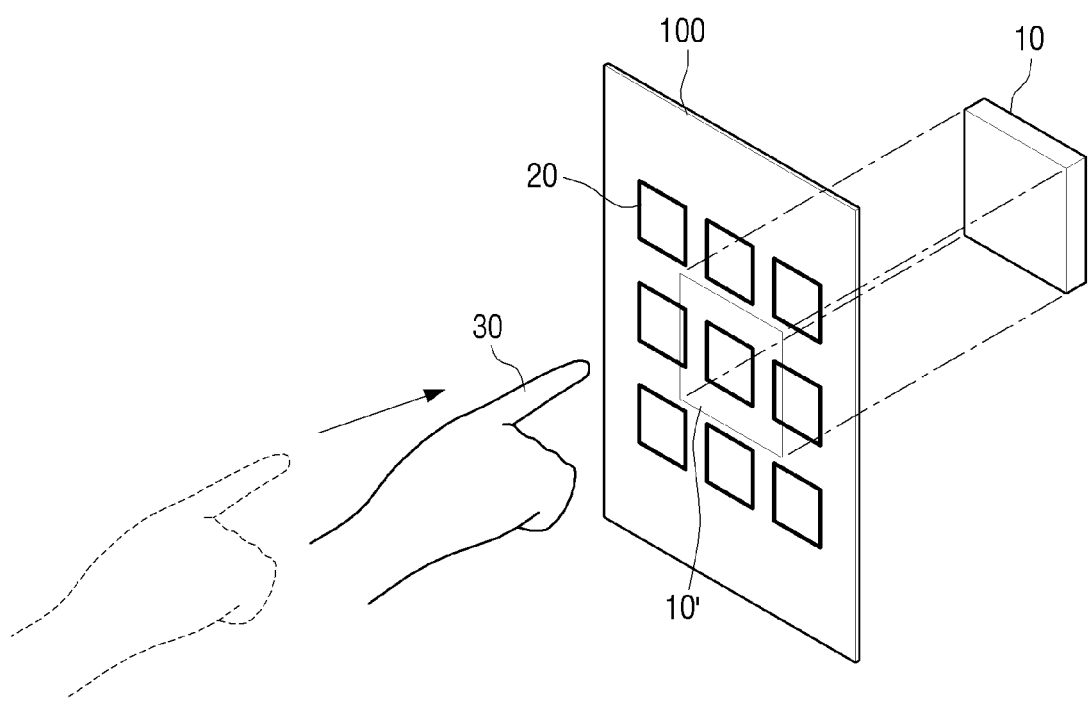
FIG. 5 is an exemplary view illustrating a display apparatus which provides a display screen with adjusted transparency according to an exemplary embodiment.

FIG. 4 is an exemplary view illustrating a display apparatus which provides a transparent display screen according to an exemplary embodiment, and FIG. 5 is an exemplary view illustrating a display apparatus which provides a display screen with adjusted transparency according to an exemplary embodiment.

As shown in FIG. 4, the display apparatus 100 allows an object 10 located outside of the display to be seen through the display and thus displays a matching object 10' on a display screen. In an exemplary embodiment, an object seen through the display screen is defined as a matching object. The display apparatus 100 which displays the matching object 10' using the display screen as described above may display a plurality of contents 20 along with the matching object 10'.

The display apparatus 100, which displays the matching object 10' corresponding to the object 10 located outside of the display and is seen through the transparent display and the plurality of contents 20 on the display screen, as described above, may set transparency of the display screen to a pre-set transparency.

That is, the display apparatus 100 senses a location of at least one of a person and an object periodically. In an exemplary embodiment, the display apparatus 100 is limited to sensing a location of a person or object. As shown in FIG. 4, if a location of user's finger 30 is sensed, the display apparatus 100 calculates a distance measurement value by measuring a distance between the finger 30 and the display apparatus 100 based on the sensed location of the finger 30. After that, the display apparatus 100 compares the calculated distance measurement value and a pre-stored threshold value, and, if the distance measurement value is greater than the pre-stored threshold value, the display apparatus 10 maintains the pre-set transparency of the display screen as shown in FIG. 4. That is, the display apparatus determines that the user's finger 30 does not approach the display apparatus 100 and thus maintains the pre-set transparency of the display screen. Accordingly, an image of the matching object 10' is displayed more clearly than images of the contents 20 i.e., the display remains transparent.

On the other hand, in an exemplary embodiment, the user's finger 30 may move toward the display apparatus 100 as show in FIG. 5. In this exemplary embodiment, the display apparatus 100 senses a location of the user's finger 30 which is moved toward the display apparatus 100 and measures a distance between the finger 30 and the display apparatus 100 based on the sensed location of the finger 30. After that, the display apparatus compares the calculated distance measurement value and the pre-stored threshold value, and, if the distance measurement value is less than or equal to the pre-stored threshold value, the display apparatus 100 decreases the transparency of the display screen to be lower than the pre-set transparency, as shown in FIG. 5. That is, the display apparatus 100 determines that the user's finger 30 approaches the display apparatus 100 and decreases the transparency of the display screen to be lower than the pre-set transparency. Accordingly, the images of the contents 20 are more clearly displayed than the image of the matching object 10' displayed on the display screen.

Figure 6:
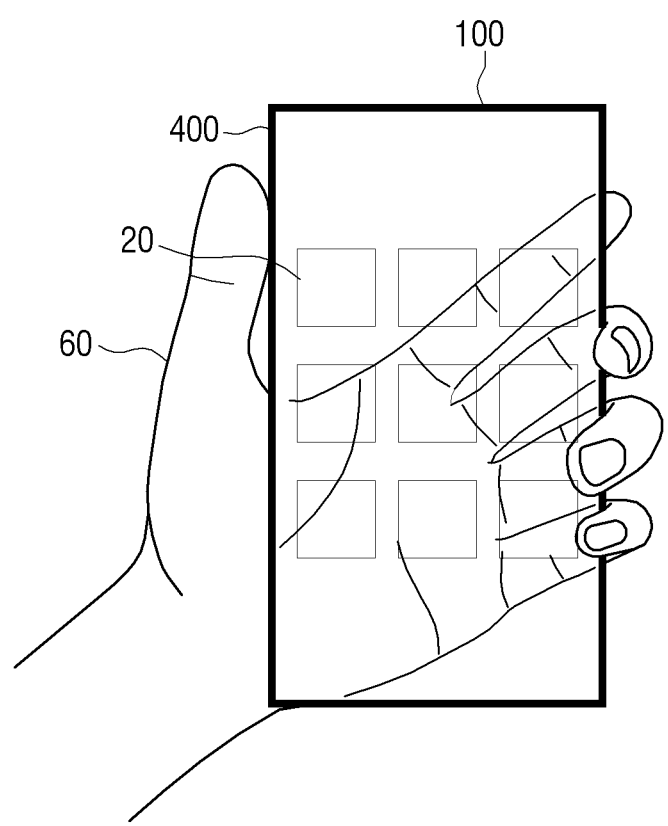
FIG. 6 is another exemplary view illustrating a method of adjusting transparency of a display screen of a display apparatus according to an exemplary embodiment.

FIG. 6 is another exemplary view illustrating a method of adjusting transparency of the display screen in the display apparatus according to an exemplary embodiment.

As shown in FIG. 6, if a user does not approach, the display apparatus 100 maintains pre-set transparency of the display screen. Accordingly, the display screen has the transparency to the extent that one side of the display apparatus 100 is transparent such that objects outside the display apparatus 100 can be seen through the display screen and can be displayed. On the display screen having the pre-set transparency, as described in an exemplary embodiment above, a plurality of contents 20 may be displayed. Definition of the plurality of contents 20 displayed on the display screen is maintained to the extent that the contents 20 placed on their respective areas are visible.

In the state in which the pre-set transparency of the display screen is maintained, the user may grip the display apparatus 100 using his/her hand 60. In this case, the display apparatus 100 may determine that the user's hand 60 is in contact with the display apparatus 100 by comparing a distance measurement value for a distance between the user's hand 60 in contact with the display apparatus 100 and the display apparatus 100, and a pre-stored threshold value. However, this should not be considered as limiting but is provided by way of an example only. The display apparatus 100 may determine whether the user's hand 60 is in contact with the display apparatus 100 or not using a touch sensor, and may determine that the user's hand 60 is in contact with the display apparatus 100.

If it is determined that the user's hand 60 is in contact with the display apparatus 100 as described above, the display apparatus 100 displays a border area of the display screen in a pre-set color 400 according to an exemplary embodiment. For example, if it is determined that the user's hand 60 is in contact with the display apparatus 100, the border area of the display screen may be displayed in blue. The other area of the display screen maintains the pre-set transparency. Accordingly, the display screen except for the border area allows the plurality of contents 20 which have low definition and a part of the user's hand 60 supporting a rear surface of the display apparatus 100 to be seen therethrough, and displays the same.

Figure 7:
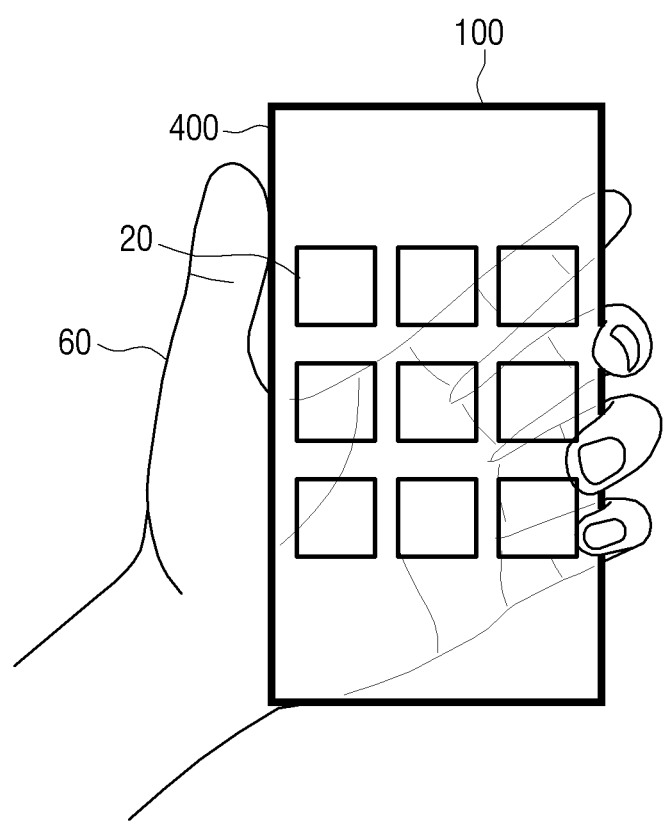
FIG. 7 is another exemplary view illustrating a method of adjusting the transparency of the display screen of the display apparatus according to an exemplary embodiment.

FIG. 7 is another exemplary view illustrating a method of adjusting the transparency of the display screen of the display apparatus according to an exemplary embodiment.

As shown in FIG. 7, if the user does not approach the display apparatus, the display apparatus 100 maintains the pre-set transparency of the display screen. Accordingly, the display screen has the transparency to the extent that objects outside the display apparatus 100 can be seen through the display screen and can be displayed. A plurality of contents 20 may be displayed on the display screen having the pre-set transparency. Accordingly, definition of the plurality of contents 20 displayed on the display screen is maintained to the extent that the contents placed on their respective areas are visible.

In the state in which the pre-set transparency of the display screen is maintained, the user may grip the display apparatus 100 using his/her own hand 60. In an exemplary embodiment, the display apparatus 100 may determine that the user's hand 60 is in contact with the display apparatus 100 by comparing a distance measurement value for a distance between the user's hand in contact with the display apparatus 100 and the display apparatus 100 and a pre-stored threshold value. However, this should not be considered as limiting and is provided by way of an example only. The display apparatus 100 may determine whether the user's hand 60 is in contact with the display apparatus 100 using a touch sensor and determine that the user's hand 60 is in contact with the display apparatus 100.

If it is determined that the user's hand 60 is in contact with the display apparatus 100 as described above, the display apparatus 100 displays a border area of the display screen in a pre-set color 400. For example, if it is determined that the user's hand 60 is in contact with the display apparatus 100, the border area of the display screen may be displayed in blue. Simultaneously, the display apparatus 100 adjusts the transparency of the display screen to be lower than the pre-set transparency. Accordingly, the other area of the display screen except for the border area displays the plurality of contents 20 which have high definition and allows only a contour of the user's hand 60 supporting the rear surface of the display apparatus 100 to be seen through the display screen. However, this should not be considered as limiting and is provided by way of an example only. In an exemplary embodiment, if the transparency of the display screen is adjusted to be 0, only the plurality of contents 20 may be displayed on the display screen without the user's hand 60 being visible.

According to an exemplary embodiment, the display apparatus 100 may adjust the transparency of the display screen in phases according to a proximity of at least one of a person and an object.

Figure 8A:
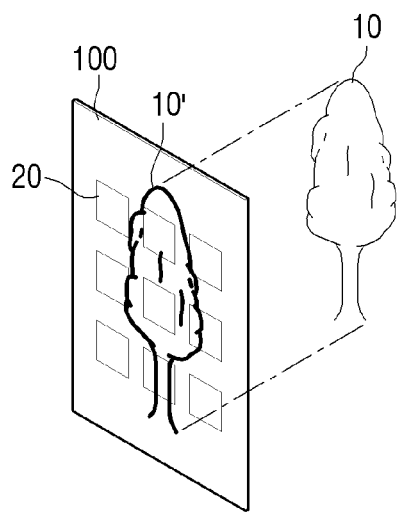
FIGS. 8A to 8C are exemplary views illustrating a method of adjusting transparency of a display screen of a display apparatus in phases according to an exemplary embodiment.
Figure 8B:
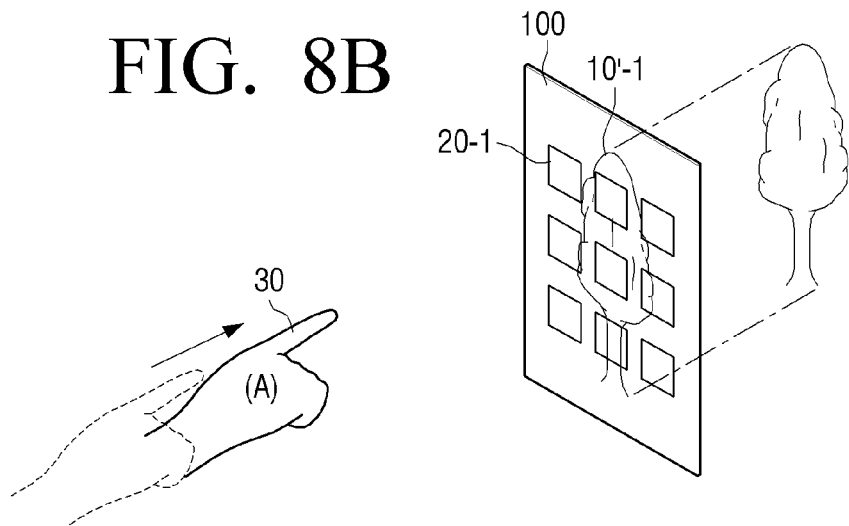
Figure 8C:
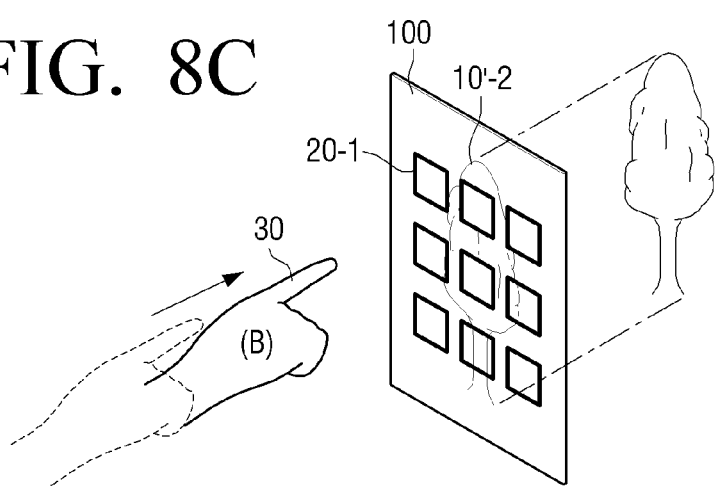

FIGS. 8A to 8C are exemplary views illustrating a method of adjusting transparency of the display screen of the display apparatus in phases according to an exemplary embodiment.

As shown in FIG. 8A, if a user does not approach the display apparatus, the display apparatus 100 maintains pre-set transparency of the display screen. Accordingly, the display screen allows an object 10 located outside of the display apparatus 100 to be seen through the display apparatus and thus, displays a matching object 10' corresponding to the object 10. The display apparatus, which displays the matching object 10' through the display screen having the pre-set transparency, may display a plurality of contents 20 using the display screen. Definition of the plurality of contents 20 displayed on the display screen is maintained to the extent that the contents 20 placed on their respective areas are visible.

In the state in which the pre-set transparency of the display screen is maintained, if user's finger 30 moves to point A (shown in FIG. 8B according to an exemplary embodiment), the display apparatus 100 calculates a distance measurement value by measuring a distance between the user's finger 30 at point A and the display apparatus 100. After that, the display apparatus 100 checks whether the calculated distance measurement value is less than or equal to a pre-stored threshold value by comparing the calculated distance measurement value and the pre-stored threshold value. If the distance measurement value is less than or equal to the pre-stored threshold value, the display apparatus 100 adjusts the transparency of the display screen according to a transparence level corresponding to the calculated distance measurement value from among a plurality of transparency levels pre-stored in the storage unit 140. For example, the transparency levels may be set from 0 to 5 at intervals of 10 cm. In an exemplary embodiment, if a distance between the user's finger 30 approaching within a value lower than the pre-stored threshold value and the display apparatus 100 is 30 cm as shown in FIG. 8B, the display apparatus 100 adjusts the transparency of the display screen to be at a transparency level 3. Accordingly, the definition of the matching object 10'-1 and the plurality of the contents 20-1 displayed on the display screen are maintained at a similar level.

If the user's finger 30 moves from point A to point B as shown in FIG. 8C according to an exemplary embodiment, the display apparatus 100 may adjust the transparency to be lower than that of the display screen of FIG. 8B. For instance, if a distance between the user's finger 30 at point B and the display apparatus 100 is 10 cm, the display apparatus 100 may adjust the transparency of the display screen to be at a transparency level 1. Accordingly, the plurality of contents 20-1 may have a much higher definition that that of the matching object 10'-2 displayed on the display screen, and the definition of the matching object 10'-2 has the opposite level of definition to that of the plurality of contents 20-1, as shown by way of an example in FIG. 8C. After that, if the user's finger 30 is in contact with the display screen, the display apparatus 100 may adjust the transparency of the display screen to be at a transparency level 0. Accordingly, only the plurality of contents 20 are displayed on the display screen and the matching object 10'-2 may be no longer visible.

Figure 9A:
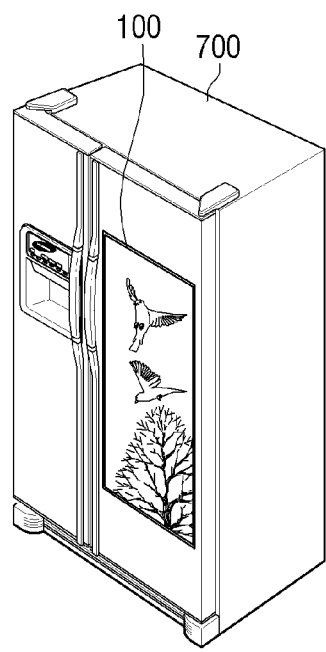
FIGS. 9A and 9B are another exemplary views illustrating a method of adjusting transparency of a display apparatus according to proximity of a user according to an exemplary embodiment.
Figure 9B:
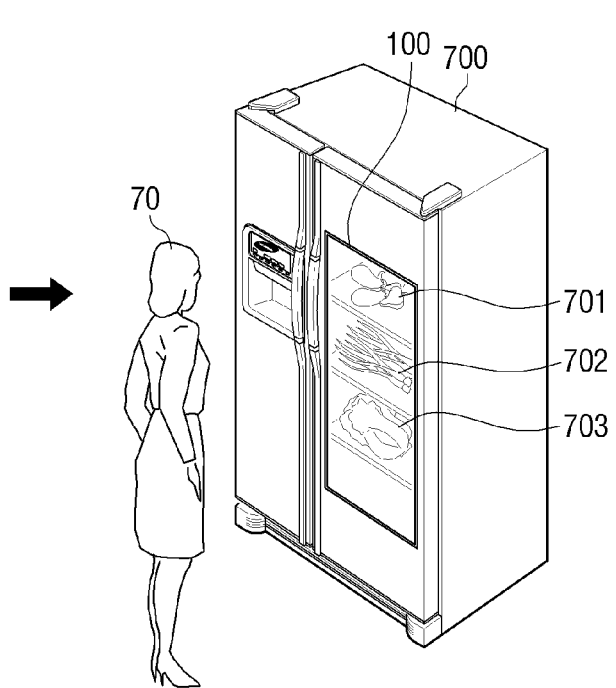

FIGS. 9A and 9B are other exemplary views illustrating a method of adjusting the transparency of the display apparatus according to proximity of the user according to an exemplary embodiment.

As shown in FIG. 9A, the display apparatus 100 may be mounted on a refrigerator 700, and may receive pre-stored contents or contents transmitted from an external server and may display the contents on the display screen. The display apparatus, which displays the pre-stored contents or the contents transmitted from the external server as described above, may determine whether a user approaches or not by sensing a location of the user periodically.

Specifically, if a user 70 approaches the refrigerator 700 as shown in FIG. 9B, the display apparatus 100 senses a location of the user 70 and calculates a distance measurement value by measuring a distance between the sensed location and the display apparatus 100. After that, the display apparatus 100 compares the calculated distance measurement value and a pre-stored threshold value, and, if the calculated distance measurement value is less than or equal to the pre-stored threshold value, the display apparatus determines that the user 70 approaches the refrigerator 700 and adjusts the transparency of the display screen displaying the contents to be a pre-set transparency. Accordingly, the transparency of the display screen displaying the contents is adjusted to be the pre-set transparency, so that foods 701 to 703 stored in the refrigerator 700 can be visible i.e., see through the display screen. Accordingly, the user may check the foods 701 to 703 stored in the refrigerator 700 using the transparent display screen without opening the refrigerator door.

Figure 10:
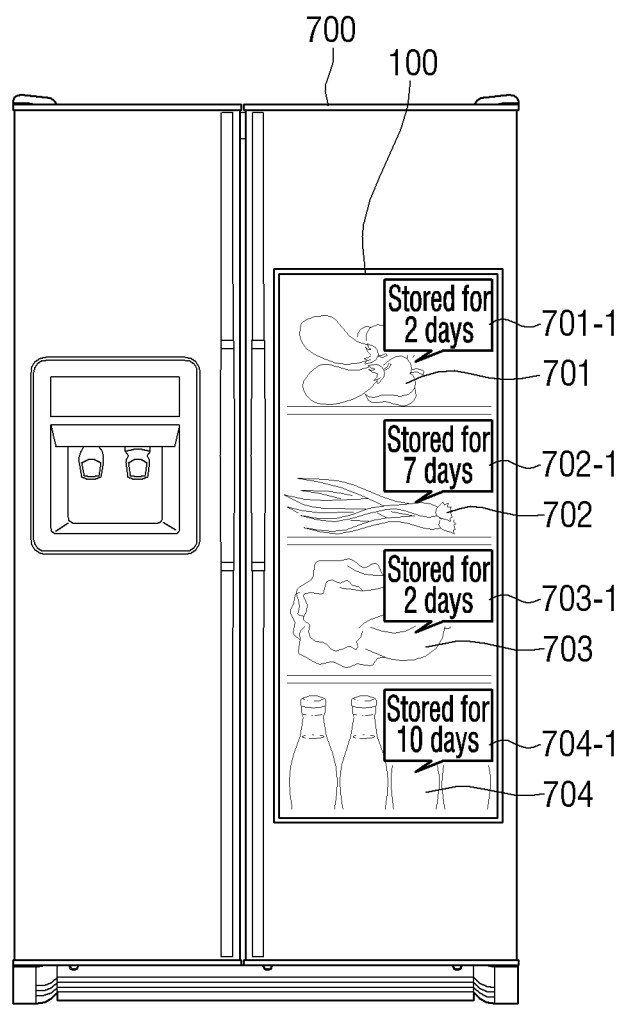
FIG. 10 is another exemplary view illustrating a method of adjusting the transparency of the display apparatus according to the proximity of the user according to an exemplary embodiment.

FIG. 10 is another exemplary view illustrating a method of adjusting the transparency of the display apparatus according to proximity of the user according to an exemplary embodiment.

If it is determined that the user 70 approaches the refrigerator 700, as shown by way of an example in FIG. 9B, the display apparatus 100 adjusts the transparency of the display screen to be a pre-set transparency. Accordingly, the transparency of the display screen displaying a content is adjusted to be the pre-set transparency, so that the foods 701-704 stored in the refrigerator 700 can be visible (seen) through the display screen and can be displayed. At this time, the display apparatus 100 may analyze images of the foods 701 to 704 displayed on the display screen and may provide additional information on each food 701 to 704.

According to an exemplary embodiment, when a new food is stored in the refrigerator 700, the display apparatus 100 photographs and stores an image of the food. In this case, the display apparatus 100 may determine a storage period of the food based on the date when the image is photographed, and match and store additional information including the storage period with the image. Accordingly, when the stored food is projected and displayed on the display screen, the display apparatus 100 may provide additional information matched with the image corresponding to the projected food.

In another exemplary embodiment, the display apparatus 100 photographs and stores an image of a food to be stored in the refrigerator 700. In this case, the display apparatus 100 may read RF (Radio Frequency) information attached to a wrapper of the food using a RF sensor, obtain additional information (e.g., an expiration date, a country of origin, and ingredients of a food, etc.) from the read RF information, match and store the obtained additional information with the pre-photographed image. Accordingly, when the stored food is projected and displayed on the display screen, the display apparatus 100 may provide additional information matched with the image corresponding to the projected food.

As shown in FIG. 10, the foods 701 to 704 stored in the refrigerator 700 are visible (seen) through the display screen and are displayed, and additional information 701-1 to 704-1 are displayed on one side of each of the foods 701 to 704. The additional information may be a storage day of each food, for example. However, the present disclosure is not limited to this, and the additional information may include the expiration date, the country of origin, and the ingredients of the food, etc., as specified above. If the additional information 701-1 to 704-1 corresponding to each food 701 to 704 is displayed on a specific area of the display, the display apparatus 100 may adjust the transparency of the area on which the additional information 701-1 to 704-1 is displayed to be lower than the pre-set transparency. Accordingly, the user can more easily recognize the additional information 701-1 to 704-1 corresponding to each food 701 to 704.

Figure 11:
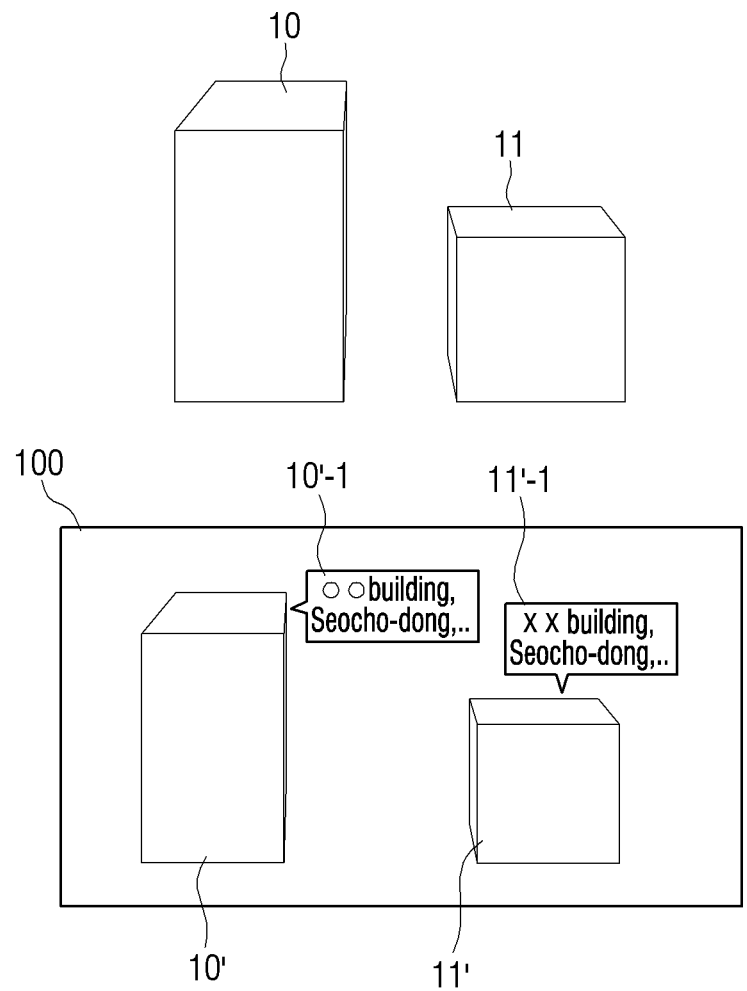
FIG. 11 is an exemplary view illustrating a method of adjusting transparency of a display screen of a display apparatus according to an area according to an exemplary embodiment.

FIG. 11 is an exemplary view illustrating a method of adjusting transparency of the display screen of the display apparatus according to an area according to an exemplary embodiment.

As shown in FIG. 11, the display apparatus 100 maintains pre-set transparency of the display screen. Accordingly, objects 10 and 11 located outside of the display apparatus 100 are visible (seen) through the display screen and thus matching objects 10' and 11' corresponding to the objects 10 and 11, respectively, are displayed. The user may execute an application for providing augmented reality according to an exemplary embodiment. According to an execution command of such an application, the display apparatus 100 may display additional information 10'-1 and 11'-1 corresponding to the matching objects 10' and 11' on one side of each matching object 10' and 11' displayed on the display screen. For example, the additional information 10'-1 and 11'-1 may identify the buildings as they appear through the display apparatus 100. If the additional information 10'-1 and 11'-1 corresponding to the matching objects 10' and 11' respectively are displayed on specific areas as described above, the display apparatus 100 may adjust transparency of the area on which the additional information 10'-1 and 11'-1 is displayed to be lower than the pre-set transparency. Accordingly, the user can easily recognize the additional information 10'-1 and 11'-1 corresponding to the matching objects 10' and 11'.

Figure 12:
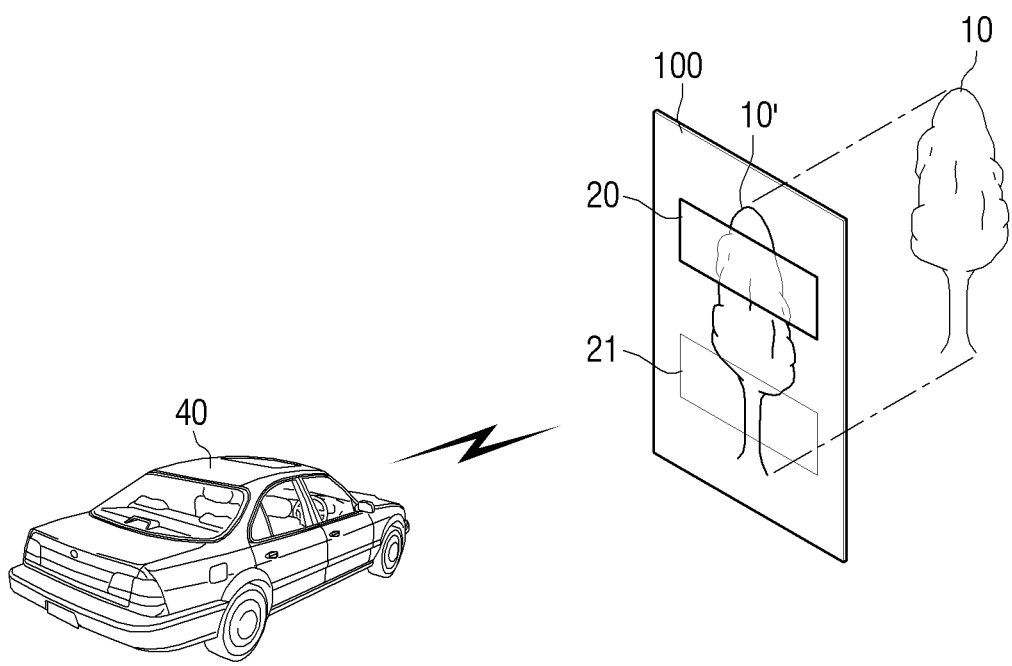
FIG. 12 is an exemplary view illustrating a method of adjusting transparency of a display screen of a display apparatus according to an area based on user information according to an exemplary embodiment.

FIG. 12 is an exemplary view illustrating a method of adjusting transparency of the display screen of the display apparatus according to an area based on user information according to an exemplary embodiment.

As shown in FIG. 12, the display apparatus 100 may be a notice board or a billboard which is installed in a place where many users frequently pass e.g., a busy highway. If the display apparatus 100 is a billboard on a road, and a vehicle 40 does not approach the display apparatus 100, the display apparatus 100 maintains pre-set transparency of the display screen. Accordingly, an object 10 located outside of the display apparatus 100 is visible (seen) through the display screen and thus a matching object 10' corresponding to the object 10 is displayed.

On the other hand, if the vehicle 40 approaches the display apparatus 100, the display apparatus 100 senses a location of the vehicle 40 approaching and calculates a distance measurement value by measuring a distance between the vehicle 40 and the display apparatus 100. After that, the display apparatus 100 compares the calculated distance measurement value and a pre-stored threshold value, and, if the calculated distance measurement value is less than or equal to the pre-stored threshold value, the display apparatus 100 determines that the vehicle 40 approaches the display apparatus 100. The display apparatus 100 may communicate with an external apparatus attached to the vehicle 40 (for example, a navigation system) and may receive user information. Accordingly, if user information is received from the vehicle 40 approaching the display apparatus 100, the display apparatus 100 may select a content 20 to be displayed in association with the user information from among a plurality of contents 20 and 21 based on the received user information. If the content 20 to be displayed in association with the user information is selected, the display apparatus 100 adjusts transparency of an area on which the corresponding content 20 is to be displayed to be lower than the pre-set transparency. As described above, in an exemplary embodiment, the display apparatus 100 according to an exemplary embodiment may adjust the transparency of the area on which the content 20 associated with the user information is to be displayed and the transparency of the other area to have different transparency levels.

Exemplary operations of adjusting the transparency of the display screen differently according to events which occur in the display apparatus have been described in various exemplary embodiments. Hereinafter, a method of adjusting a transparency of the display screen based on events which occur in the display apparatus according to an exemplary embodiment will be explained in detail.

Figure 13:
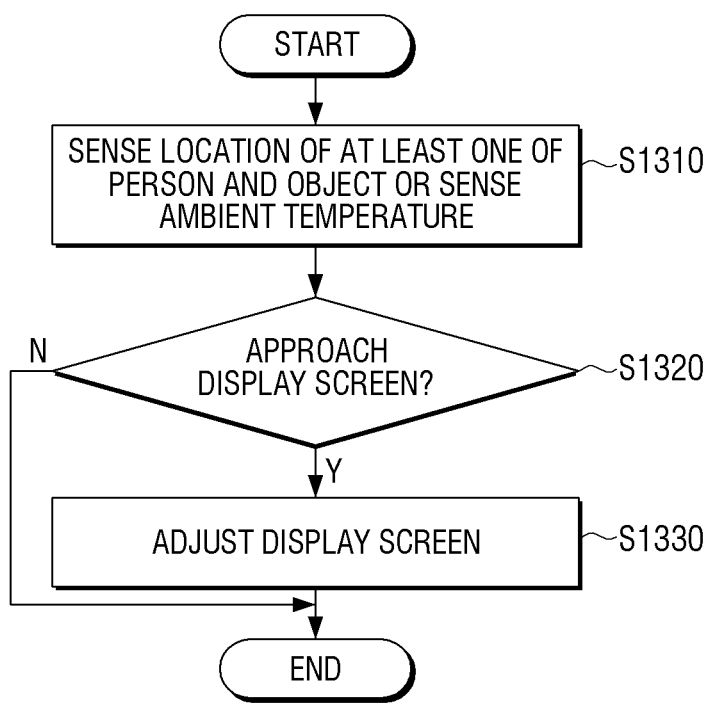
FIG. 13 is a flowchart illustrating a method of adjusting transparency of a display screen of a display apparatus according to an exemplary embodiment.

FIG. 13 is a flowchart illustrating a method of adjusting transparency of the display screen of the display apparatus according to an exemplary embodiment.

As shown in FIG. 13, the display apparatus senses a location of at least one of a person and an object or it senses a change in ambient temperature (in operation S1310). Accordingly, the display apparatus may sense the location of at least one of the person and the object using at least one of a proximity sensor, an IR sensor, an RF sensor, a gyro sensor, an acceleration sensor, an ultrasonic sensor, and a touch sensor. The display apparatus senses the location of at least one of the person and the object located near the display apparatus using such a sensor, and calculates a distance measurement value by measuring a distance between the at least one of the person and the object and the display apparatus. After that, the display apparatus compares the calculated distance measurement value and a pre-stored threshold value, and, if the calculated distance measurement value is less than or equal to the pre-stored threshold value, the display apparatus determines that the at least one of the person and the object approaches the display apparatus.

However, this should not be considered as limiting and is provided by way of an example only. The display apparatus senses an ambient temperature of the display apparatus using a temperature sensor, and compares the sensed ambient temperature and a pre-stored threshold value. If the sensed ambient temperature is less than or equal to the pre-stored threshold value, the display apparatus may determine that at least one of the person and the object approaches the display apparatus.

In exemplary embodiments, transparency of the display screen is adjusted according to whether at least one of the person and the object approaches the display apparatus. Therefore, hereinafter, an operation of determining whether at least one of the person and the object approaches the display apparatus 100 according to a location of the at least one of the person and the object, and adjusting transparency of the display screen differently according to a result of the determining will be explained by way of an example. Exemplary structure of the display screen which can adjust the transparency has been described above with reference to FIGS. 2 and 3 and thus a detailed description thereof is omitted here.

As described above, if the location of at least one of the person and the object is sensed by the display apparatus, the display apparatus may calculate a distance measurement value by measuring a distance between the display apparatus and the at least one of the person and the object according to the sensed location. After that, the display apparatus compares the calculated distance measurement value and a pre-stored threshold value and determines whether the at least one of the person and the object approaches the display screen of the display apparatus or not (in operation S1320). The pre-stored threshold value is a value based on which it is determined whether at least one of the person and the object approaches the display apparatus or not. Accordingly, if it is determined that the at least one of the person and the object approaches the display screen of the display apparatus as a result of comparing the calculated distance measurement value and the pre-stored threshold value, the display apparatus adjusts the transparency of the display screen to be lower than pre-set transparency (in operation S1330).

According to an exemplary embodiment, if the calculated distance measurement value is less than or equal to the pre-stored threshold value, the display apparatus determines that the at least one of the person and the object approaches the display apparatus. Accordingly, the display apparatus may decrease the transparency of the display screen to be lower than the pre-set transparency. On the other hand, if the calculated distance measurement value is greater than the pre-stored threshold value, it is determined that the at least one of the person and the object does not approach the display apparatus. Accordingly, the display apparatus may return the transparency of the display screen to the pre-set transparency. If the transparency of the display screen is decreased to be lower than the pre-set transparency, visibility of a content currently displayed on the display screen increases, and, if the pre-set transparency is restored, the transparency of the display screen increases and thus the visibility of the object located outside of the display apparatus and that are visible through the display apparatus increases.

As described above, the display apparatus according to an exemplary embodiment may adjust the transparency of the display screen differently according to a proximity of at least one of the person and the object to the display apparatus.

According to another exemplary embodiment, the display apparatus compares the calculated distance measurement value and the pre-stored threshold value, and, if the calculated distance measurement value is less than or equal to the pre-stored threshold value, the display apparatus may display a border area of the display screen in a different color.

For example, as shown in FIG. 6, if a user does not approach, the display apparatus maintains pre-set transparency of the display screen. In the state in which the pre-set transparency of the display screen is maintained, if the user's hand 60 is in contact with the display apparatus, the display apparatus displays the border area of the display screen in a pre-set color 400. For example, it is determined that the user's hand 60 is in contact with the display apparatus 100, the border area of the display screen is displayed in blue. The other area of the display screen maintains the pre-set transparency. However, this should not be considered as limiting and is provided by way of an example only. If the user's hand is in contact with the display apparatus 100, the display apparatus 100 may display the border area of the display screen in the pre-set color 400 and may adjust the transparency of the other area of the display screen to be lower than the pre-set transparency as shown in FIG. 7 by way of an example.

According to still another exemplary embodiment, the display apparatus may adjust the transparency of the display screen differently according to a result of comparing the calculated distance measurement value and the pre-stored threshold value. Specifically, if a distance measurement value between at least one of a person and an object and the display screen is calculated, the display apparatus may adjust the transparency of the display screen based on a transparency level corresponding to the calculated distance measurement value from among a plurality of transparency levels pre-stored.

For example, as shown in FIG. 8A, if a user does not approach, the display apparatus may maintain pre-set transparency of the display screen. If the user's finger 30 moves to point A as shown in FIG. 8B, the display apparatus calculates a distance measurement value by measuring a distance between the user's finger 30 at point A and the display apparatus. If the calculated distance measurement value is less than or equal to a pre-stored threshold value, the display apparatus determines a transparency level corresponding to the calculated distance measurement value from among the plurality of transparency levels pre-stored and adjusts the transparency of the display screen according to the corresponding transparency level. If the determined transparency level is an intermediate level, the matching object 10' and the plurality of the contents 20 displayed on the display screen have similar definition. On the other hand, if the user's finger 30 moves from point A to point B as shown in FIG. 8C, the display apparatus determines that the user's finger 30 further approaches and adjusts the transparency of the display screen to be lower than the transparency level determined in FIG. 8B. Accordingly, the plurality of contents 20 may have very high definition, whereas the matching object 10' may have the opposite level of definition to that of the plurality of contents 20.

According to yet another exemplary embodiment, the display apparatus compares the calculated distance measurement value and the pre-stored threshold value, and, if the calculated distance measurement value is less than or equal to the pre-stored threshold value, the display apparatus may change a screen displayed on the display screen to a pre-set screen. If the calculated distance measurement value is greater than the pre-stored threshold value, the display apparatus may change the pre-set screen displayed on the display screen to a transparent screen. As described above, the display apparatus according to exemplary embodiments may increase the transparency of the display screen so that the object located outside of the display apparatus can be visible (seen) through the display screen, or may change the current display screen into the pre-set transparency screen according to a proximity of at least one of the person and the object to the display screen.

According to still another exemplary embodiment, in a state in which the display screen provides a content execution screen which has transparency lower than a pre-set transparency, if the calculated distance measurement value is less than or equal to the pre-stored threshold value, the display apparatus may increase the transparency of the display screen providing the content execution screen to be the pre-set transparency.

For example, as shown in FIGS. 9A and 9B, the display apparatus may be mounted on the refrigerator 700, and may display a pre-stored content or may receive a content transmitted from an external server and display the content on the display screen. As shown in FIG. 9B, if the user 70 approaches a place where the refrigerator 700 is located as shown in FIG. 9B, the display apparatus senses a location of the user 70 and calculates a distance measurement value by measuring a distance between the sensed location and the display apparatus. After that, the display apparatus compares the calculated distance measurement value and a pre-stored threshold value, and, if the calculated distance measurement value is less than or equal to the pre-stored threshold value, the display apparatus determines that the user 700 approaches the refrigerator 700. Accordingly, the display apparatus adjusts transparency of the display screen currently displaying the content to be the pre-set transparency. Accordingly, the foods 701 to 703 stored in the refrigerator 700 can be visible (seen) through the display screen.

According to still another exemplary embodiment, the display screen may provide a content execution screen which has transparency higher than the pre-set transparency. In this case, the display apparatus compares the calculated distance measurement value and the pre-stored threshold value, and, if the calculated distance measurement value is less than or equal to the pre-stored threshold value, the display apparatus may decrease transparency of an area in which pre-set information is displayed out of an entire area of the display screen. According to such a control command, the object located outside of the display apparatus is visible (seen) through only a part of the entire area of the display screen and the pre-set information is displayed on the other area through which the object is not visible (seen).

For example, the display apparatus maintains pre-set transparency of the display screen as explained in FIG. 11. Accordingly, the objects 10 and 11 located outside of the display apparatus 100 are visible (seen) through the display screen and thus the matching objects 10' and 11' corresponding to the objects 10 and 20, respectively, may be displayed. The display apparatus may execute an application for realizing augmented reality according to a user request. In this case, the display apparatus displays additional information 10'-1 and 11'-1 corresponding to the matching objects 10' and 11' on one side of each of the matching objects 10' and 11' displayed on the display screen. If the additional information 10'-1 and 11'-1 corresponding to each of the matching objects 10' and 11' is displayed on a specific area, the display apparatus may adjust transparency of the area on which the additional information 10'-1 and 11'-1 is displayed to be lower than the pre-set transparency.

According to still another exemplary embodiment, if the calculated distance measurement value is less than or equal to the pre-stored threshold value, the display apparatus may decrease transparency of an area on which a content associated with user information is displayed to be lower than the pre-set transparency based on the user information received from an external apparatus.

For example, if the display apparatus 100 is a billboard on a road, as shown in FIG. 12, the display apparatus maintains the pre-set transparency of the display screen. If a vehicle 40 approaches the display apparatus, the display apparatus measures a distance between the vehicle and the display apparatus by sensing a location of the vehicle approaching, and calculates a corresponding distance measurement value. After that, the display apparatus determines whether the vehicle 40 approaches the display apparatus by comparing the calculated distance measurement value and a pre-stored threshold value. The display apparatus may receive user information by communicating with an external apparatus (for example, a navigation system) attached to the vehicle 40. Accordingly, the display apparatus may adjusts transparency of an area on which a content 20 associated with the user information is to be displayed from among a plurality of contents 20 and 21 displayed on the display screen to be lower than the pre-set transparency based on the received user information. As described above, the display apparatus according to still another exemplary embodiment may adjust the transparency of the area on which the content 20 associated with the user information is to be displayed and the transparency of the other area of the display screen to have different transparency levels.

The various exemplary methods according to the above-described various exemplary embodiments may be programmed and stored in various storing media. Accordingly, the exemplary methods according to the above-described various exemplary embodiments may be realized in various types of electronic apparatuses which execute a storage medium.

Specifically, according to an exemplary embodiment, a non-transitory computer readable medium storing a program, which performs sensing at least one of a person and an object, determining proximity of a display screen based on a result of the sensing, and adjusting transparency of the display screen differently according to a result of the determining in sequence, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a CD, a DVD, a hard disk, a Blueray disk, a USB, a memory card, and a ROM, and may be provided.

The foregoing exemplary embodiments are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art. It is understood that all possible changes and/or modifications in form and details may be made therein without departing from the spirit and scope of an inventive concept as defined by the appended claims and their equivalents. The scope is defined not by the detailed description of exemplary embodiments but by the appended claims, and their equivalents and all differences within the scope will be construed as being included in an inventive concept.

What is claimed is:

1. A display apparatus comprising:
a display with variable transparency;
a sensor which senses a location of an entity; and
a controller which determines proximity of the entity to the display based on a result of the sensing by the sensor, and which adjusts transparency of the display differently according to a result of the determining, wherein, when a distance between the display and the entity is less than or equal to a predetermined threshold value, the controller decreases the transparency of the display to be lower than a pre-set transparency.

2. The display apparatus as claimed in claim 1, further comprising a storage which stores the predetermined threshold value for determining the proximity by the controller.

3. The display apparatus as claimed in claim 2, wherein, when the distance between the display and the entity is greater than the predetermined threshold value, the controller maintains the display at the pre-set transparency or returns the display to the pre-set transparency.

4. The display apparatus as claimed in claim 2, wherein, if the distance between the display and the entity is less than or equal to the predetermined threshold value, the controller controls the display to display a border area on the display.

5. The display apparatus as claimed in claim 4, wherein the controller controls the display to display the border area in a distinct color.

6. The display apparatus as claimed in claim 2, wherein, if the distance between the display and the entity is less than or equal to the predetermined threshold value, the controller changes a screen displayed through the display to a pre-set screen.

7. The display apparatus as claimed in claim 2, wherein the storage further stores a plurality of transparency levels which are classified by the proximity of the entity to the display, and
wherein the controller adjusts the transparency of the display according to a transparency level, selected from among the plurality of transparency levels, corresponding to the determined proximity.

8. The display apparatus as claimed in claim 2, wherein the display provides a content execution screen which has a transparency lower than the pre-set transparency, and
wherein, if the distance between the display and the entity is less than or equal to the predetermined threshold value, the controller increases the transparency of the display displaying contents to the pre-set transparency.

9. The display apparatus as claimed in claim 2, wherein the display provides a content execution screen which has a transparency higher than the pre-set transparency, and
wherein, if the distance between the display and the entity is less than or equal to the predetermined threshold value, the controller decreases the transparency of a portion of the display where pre-set information is displayed.

10. The display apparatus as claimed in claim 2, further comprising a communication interface which communicates with an external apparatus,
wherein, if the distance between the display and the entity is less than or equal to the predetermined threshold value, the controller decreases transparency of an area on which a content associated with user information received from the external apparatus is displayed to be lower than the pre-set transparency based on the user information.

11. The display apparatus as claimed in claim 1, wherein the sensor comprises at least one of a proximity sensor, an IR sensor, an RF sensor, a gyro sensor, an acceleration sensor, an ultrasonic sensor, and a touch sensor.

12. The display apparatus as claimed in claim 1, wherein the sensor further senses an ambient temperature of the display,
wherein the controller determines the proximity of the entity to the display based on the sensed ambient temperature.

13. The display apparatus as claimed in claim 1, wherein the entity comprises at least one of a person or a part thereof and an object.

14. A method for displaying a display screen of a display apparatus, the method comprising:
sensing a location of an entity;
determining proximity of the entity to the display screen based on a result of the sensing; and
adjusting transparency of the display screen differently according to a result of the determining,
wherein the adjusting comprises, when a distance between the display screen and the entity is less than or equal to a predetermined threshold value, decreasing the transparency of the display screen to be lower than a pre-set transparency.

15. The method as claimed in claim 14, wherein the adjusting comprises, when the distance between the display screen and the entity is greater than the predetermined threshold value, maintaining or returning the transparency to the pre-set transparency.

16. The method as claimed in claim 14, wherein if the distance between the display screen and the entity is less than or equal to the predetermined threshold value, the adjusting comprises displaying a border area on the display screen.

17. The method as claimed in claim 14, wherein if the distance between the display screen and the entity is less than or equal to the predetermined threshold value, the adjusting comprises changing the display screen to a pre-set screen.

18. The method as claimed in claim 14, wherein the adjusting comprises adjusting the transparency of the display screen according to a transparency level, selected from among a plurality of transparency levels, corresponding to the distance between the display screen and the entity, and
wherein the plurality of transparency levels are classified by the proximity of the entity to the display screen and are pre-stored.

19. The method as claimed in claim 14, wherein the adjusting comprises providing a content execution screen which has a transparency lower than the pre-set transparency, and
wherein if the distance between the display screen and the entity is less than or equal to the predetermined threshold value, the adjusting comprises increasing the transparency of the display screen displaying contents to the pre-set transparency.

20. The method as claimed in claim 14, wherein the adjusting comprising providing a content execution screen which has transparency higher than the pre-set transparency, and
wherein if the distance between the display screen and the entity is less than or equal to the predetermined threshold value, the adjusting comprises decreasing transparency of a portion of the screen on which pre-set information is displayed.

21. The method as claimed in claim 14, wherein if the distance between the display screen and the entity is less than or equal to the predetermined threshold value, the adjusting comprises decreasing the transparency of only a portion of the screen on which a content associated with user information received from an external apparatus is displayed to be lower than the pre-set transparency based on the user information.

22. The method as claimed in claim 14, wherein the sensing comprises sensing by at least one of a proximity sensor, an IR sensor, an RF sensor, a gyro sensor, an acceleration sensor, an ultrasonic sensor, and a touch sensor.

23. The method as claimed in claim 14, wherein the sensing further comprises sensing an ambient temperature of the display screen, and
wherein the determining comprises determining the proximity of the entity to the display screen based on the sensed ambient temperature.

* * * * *